US011369054B2

(12) United States Patent
Kowalchuk et al.

(10) Patent No.: US 11,369,054 B2
(45) Date of Patent: Jun. 28, 2022

(54) SMART SENSOR SYSTEM FOR SEEDING IMPLEMENT

(71) Applicant: CNH Industrial Canada, Ltd., Saskatoon (CA)

(72) Inventors: Trevor Lawrence Kowalchuk, Saskatoon (CA); Dennis George Thompson, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 239 days.

(21) Appl. No.: 16/453,457

(22) Filed: Jun. 26, 2019

(65) Prior Publication Data

US 2020/0404831 A1 Dec. 31, 2020

(51) Int. Cl.
| | |
|---|---|
| *A01B 63/111* | (2006.01) |
| *A01B 63/24* | (2006.01) |
| *A01C 5/06* | (2006.01) |
| *A01B 79/00* | (2006.01) |
| *A01B 63/00* | (2006.01) |

(52) U.S. Cl.
CPC ........ *A01B 63/1115* (2013.01); *A01B 63/008* (2013.01); *A01B 63/24* (2013.01); *A01B 79/005* (2013.01); *A01C 5/064* (2013.01)

(58) Field of Classification Search
CPC ... A01B 63/1115; A01B 63/008; A01B 63/24; A01B 79/005; A01B 63/111; A01B 63/10; A01B 63/02; A01B 63/00; A01B 63/002; A01B 63/14; A01B 79/00; A01C 5/064; A01C 5/062; A01C 5/06; A01C 5/00
See application file for complete search history.

(56) References Cited

U.S. PATENT DOCUMENTS

| | | | |
|---|---|---|---|
| 7,574,969 | B1 | 8/2009 | Henry et al. |
| 7,814,847 | B2 | 10/2010 | Schilling et al. |
| 8,061,282 | B2 | 11/2011 | Borland |
| 8,418,636 | B2 | 4/2013 | Liu et al. |
| 8,755,049 | B2 | 6/2014 | Holland |
| 8,935,986 | B2 | 1/2015 | Blomme et al. |
| 9,167,742 | B2 | 10/2015 | Masten et al. |
| 9,629,304 | B2 | 4/2017 | Zielke |
| 9,924,629 | B2 | 3/2018 | Batcheller et al. |
| 9,943,027 | B2 | 4/2018 | Sauder et al. |
| 10,080,323 | B2 | 9/2018 | Lund et al. |
| 2003/0016029 | A1 | 1/2003 | Schuler et al. |

(Continued)

FOREIGN PATENT DOCUMENTS

| | | |
|---|---|---|
| WO | 2015171908 A1 | 11/2015 |
| WO | 2017197274 A1 | 11/2017 |

OTHER PUBLICATIONS

Smartfirmer, "Sense Your Soil, On The Fly", Precision Planting, Nov. 14, 2018.

*Primary Examiner* — Christopher J. Novosad
(74) *Attorney, Agent, or Firm* — Rebecca L. Henkel; Rickard K. DeMille

(57) ABSTRACT

An agricultural planting or seeding implement that includes a ground engaging tool that forms a trench in a field. The ground engaging tool includes a blade that forms the trench. A first conduit couples to the blade. The first conduit deposits agricultural product in the field. A sensor couples to the ground engaging tool. The sensor generates a signal indicative of a soil property of the field.

17 Claims, 7 Drawing Sheets

(56) References Cited

U.S. PATENT DOCUMENTS

| | | |
|---|---|---|
| 2015/0181800 A1* | 7/2015 | Glowa .................... A01C 7/04 |
| | | 111/200 |
| 2015/0296698 A1* | 10/2015 | Schumacher .......... A01B 71/02 |
| | | 172/4 |
| 2017/0049044 A1 | 2/2017 | Stoller et al. |
| 2017/0094889 A1 | 4/2017 | Garner et al. |
| 2018/0228078 A1 | 8/2018 | Hubner et al. |
| 2018/0238823 A1 | 8/2018 | Puhalla et al. |
| 2018/0239044 A1 | 8/2018 | Rhodes et al. |
| 2018/0317381 A1 | 11/2018 | Bassett |

* cited by examiner

SMART SENSOR SYSTEM FOR SEEDING IMPLEMENT

BACKGROUND

The invention relates generally to agricultural equipment, and more particularly to agricultural planting or seeding implements.

Seeding implements enable the rapid planting of agricultural fields. These implements include multiple row units that open the ground and deposit seeds to form rows of crops. In order to plant the seeds, the row units include a respective ground engaging tool or opener that forms a trench in the soil into which the seeds are deposited. As the seeding implement traverses the field, the properties of the soil may vary. These properties may include soil moisture, soil temperature, and organic matter content. Unfortunately, the variation in soil properties may affect the emergence and growth of the seeds.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an agricultural planting or seeding implement that includes a ground engaging tool that forms a trench in a field. The ground engaging tool includes a blade that forms the trench. A first conduit couples to the blade. The first conduit deposits agricultural product in the field. A sensor couples to the ground engaging tool. The sensor generates a signal indicative of a soil property of the field.

In an embodiment, a ground engaging tool that forms a trench in a field. The ground engaging tool includes a ground engaging tool body. A blade couples to the ground engaging tool body. The blade forms the trench in the field. A first conduit couples to the blade and deposits agricultural product in the field. A sensor couples to the ground engaging tool. The sensor generates a signal indicative of a soil property of the field.

In an embodiment, a ground engaging tool forms a trench in a field. The ground engaging tool includes a ground engaging tool body. A blade couples to the ground engaging tool body. The blade curves from a front edge to a rear surface. The blade forms the trench in the field. A conduit couples to the blade and deposits agricultural product in the field. A sensor couples to the ground engaging tool. The sensor generates a signal indicative of a soil property of the field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed to agricultural implements that deposit agricultural products into the soil (e.g., seeds, fertilizer). The agricultural implement includes a soil sensor system that enables the detection of soil characteristics or properties that affect the growth and emergence of seeds. These soil characteristics or properties may include soil moisture, soil temperature, organic matter content, soil type, soil compaction, soil nutrient level (e.g., nitrogen, phosphorous, potassium, sulphur, micronutrients), residue properties (e.g., amount of residue in trench, residue type, moisture content of residue), among others. The soil sensor senses these soil characteristics or properties and emits signals indicative of these soil characteristics or properties. The soil sensor system uses these signals to determine the soil characteristics or properties and in response varies the depth of the trench in which the agricultural product is deposited. It should be understood that each row unit on the implement may have an associated soil sensor system that enables soil characteristic or property detection in the path of the row unit. The trench depth of each row unit may therefore be adjusted to facilitate placement of agricultural product in desirable soil conditions.

Figure 1:
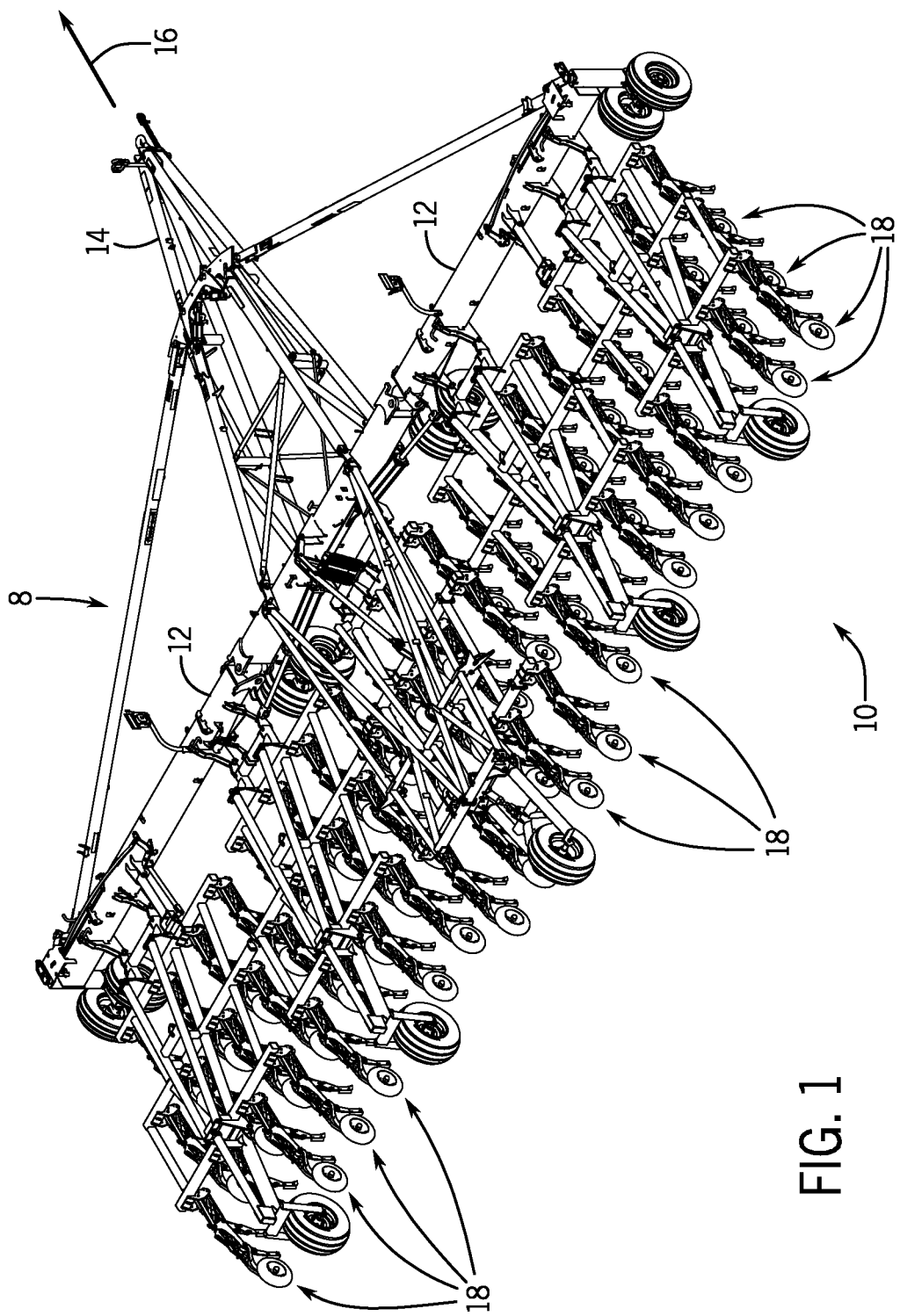
FIG. 1 is a perspective view of a seeding implement including multiple row units, according to an embodiment of the disclosure.

Referring now to the drawings, FIG. 1 illustrates a perspective view of one embodiment of a seeding implement 8 with a soil sensor system 10. As will be explained below the soil sensor system 10 enables detection of soil characteristics or properties. In response to the detected characteristics or properties the seeding implement 8 may adjust the depth at which seeds are planted as the seeding implement 8 traverses the field. It should be understood that the discussion below is equally applicable to a planter, the terms planter and seeding implement should therefore be considered interchangeable.

As shown in FIG. 1, the seeding implement 8 may include a laterally extending toolbar or frame assembly 12 connected at its middle to a forwardly extending tow bar 14 to allow the seeding implement 8 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the seeding implement 8 is being towed by the work vehicle, thereby establishing rows of planted seeds. In some embodiments, the bulk of the seeds to be planted may be stored in one or more hoppers or seed tanks (not shown). Thus, as seeds are planted by the row units 18, a pneumatic distribution system may distribute additional seeds from the seed tanks to the individual row units 18. Additionally, one or more tanks may store fertilizer, insecticides, herbicides, and fungicides.

In general, the seeding implement 8 may include any number of row units 18, such as 24, 32, 36, 74, 96 or more row units. In addition, it should be appreciated that the lateral spacing between row units 18 may be selected based on the type of crop being planted. It should also be appreciated that the configuration of the seeding implement 8 described above and shown in FIG. 1 is provided only to place the present subject matter in an exemplary field of use. Thus, it should be appreciated that the present subject matter may be readily adaptable to any manner of planter or seeding implement configuration.

Figure 2:
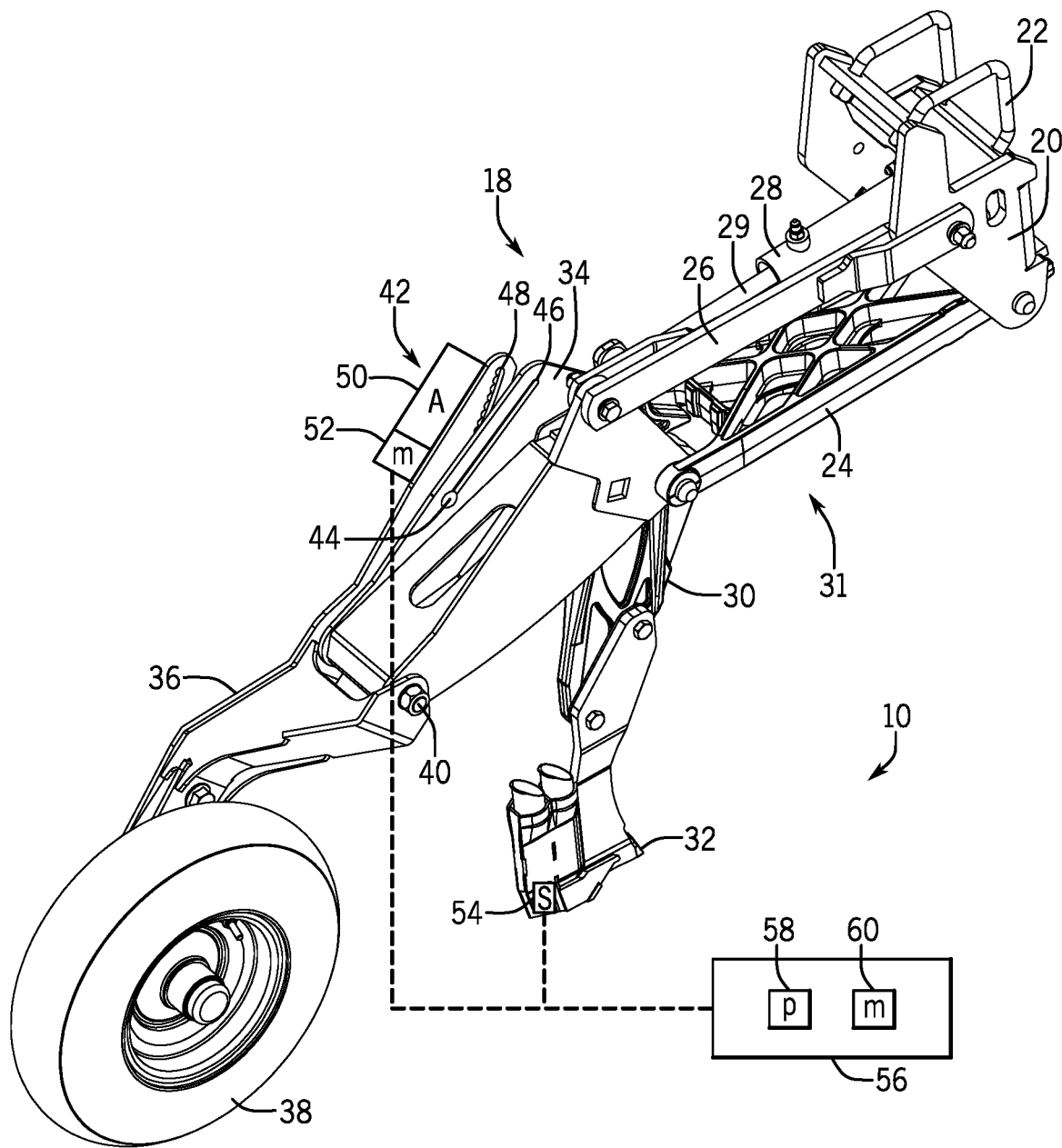
FIG. 2 is a perspective view of a row unit with a soil sensor system, according to an embodiment of the disclosure.

FIG. 2 is a perspective view of an exemplary row unit 18 that includes the soil sensor system 10 capable of sensing characteristics or properties of the soil, such as soil moisture, soil temperature, organic matter content, soil type, soil compaction, soil nutrient level (e.g., nitrogen, phosphorous, potassium, sulphur, micronutrients), residue properties (e.g., amount of residue in trench, residue type, moisture content of residue), among others. As illustrated, the row unit 18 includes a frame support 20, mounting brackets 22, a rod or bar 24, a plate or bar 26, and a biasing device such as a cylinder 28 (e.g., hydraulic and/or pneumatic piston-cylinder assembly). The cylinder 28 hydraulically couples to a power supply that provides a flow of pressurized hydraulic fluid that displaces a piston rod 29 extending from the cylinder 28. The frame support 20 and frame bracket 22 are configured to interface with a tool frame on the implement 8 to secure the row unit 18 to the seeding implement 8. For instance, multiple row units 18 may be mounted in parallel along the tool bar 12 to form a seeding unit.

The cylinder 28 is attached to a shank 30 via a pin at the end of the piston rod. The shank 30 in turn couples to a ground engaging tool, such as the illustrated opener 32 configured to engage the soil. Contact force between the opener 32 and the soil establishes a moment about a shank pivot joint. This moment is resisted by force applied to the shank 30 by the cylinder 28. In the present configuration, the rod or bar 24, and the frame support 20 form elements of a parallel linkage, also known as a four bar linkage 31 that enables lifting and lowering of the row unit 18 relative to the frame support 20, or more specifically, lifting and lowering of the opener 32. By lifting and lowering opener 32, the linkage 31 facilitates a desired penetration depth by the opener 32.

As illustrated, the linkage 31 couples to a packer support structure, such as the illustrated packer support structure 34. A packer arm 36, including a packer wheel 38, is pivotally coupled to the packer support structure 34. The packer wheel 38 rotates along the soil surface to both pack the soil on top of deposited seeds and limit the penetration depth of the opener 32. As illustrated, a pin 40 disposed through openings within the packer arm 36 and the packer support structure 34 (e.g., plate) enables rotation of the packer arm 36 with respect to the packer support structure 34. However, in a working mode, rotation of the packer arm 36 relative to the packer support structure 34 is blocked by a depth adjustment system 42.

The depth adjustment system 42 includes a pin 44 disposed within a slot 46 in the packer support structure 34 and a corresponding slot 48 in the packer arm 36. Movement of the pin 44 may be controlled with an actuator 50 driven by a motor 52. As the pin 44 moves within the slots 46 and 48, the packer arm 36 rotates about the pin 44. Such an adjustment varies the vertical position of the opener 32 relative to the packer wheel 38, thereby altering the penetration depth of the opener 32. Once a desired penetration depth is reached, the motor 52 may stop movement of the actuator 50 to block movement of the pin 44. By limiting movement of the pin 44, the depth adjustment system 42 limits or blocks rotation of the packer arm 36 and thus vertical movement of the opener 32. In some embodiments, the depth adjustment system 42 may be a cam system, wherein rotation of a cam changes the position of the packer arm 36.

As mentioned above, the soil sensor system 10 enables detection of soil characteristics or properties. The soil sensor system 10 may therefore include one or more sensors 54 (e.g., 1, 2, 3, 4, 5) that measure characteristics or properties of the soil. For example, the sensors 54 may measure soil moisture, soil temperature, organic matter content, among others. In some embodiments, the sensors 54 may include light emitters and detectors. In operation, the light emitters may emit light at one or more wavelengths, depending on characteristic(s) being measured, which is then detected by the detector of the sensor. The changes in the reflected light enable the soil sensor system 10 to determine soil properties and characteristics.

In order to detect soil properties and characteristics, the soil sensor system 10 includes a controller 56 that couples to the sensors 54. The controller 56 may include a processor 58 and a memory 60 used in processing one or more signals from the one or more sensors 54. For example, the processor 58 may be a microprocessor that executes software in response to the one or more signals from the sensors 54. The processor 58 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 58 may include one or more reduced instruction set (RISC) processors.

The memory 60 may include a volatile memory, such as random access memory (RAM), and/or a nonvolatile memory, such as read-only memory (ROM). The memory 60 may store a variety of information and may be used for various purposes. For example, the memory 60 may store processor executable instructions, such as firmware or software, for the processor 58 to execute. The memory may include ROM, flash memory, a hard drive, or any other suitable optical, magnetic, or solid-state storage medium, or a combination thereof. The memory may store data, instructions, and any other suitable data.

As the controller 56 receives signals from the sensors 54, the controller 56 controls operation of the row unit 18. The signals emitted by the sensors 54 are indicative of various soil properties, including soil moisture, soil temperature, and organic matter content. In response, to detecting the soil properties from the sensor signals, the controller 56 controls the motor 52. The motor 52 in turn controls actuator 50 (e.g., worm gear actuator) to move the packer arm 36 relative to the packer support structure 34 to lift and lower the packer wheel 38 and thus the opener 32. For example, in response to the detection by the controller 56 of soil moisture below a threshold level, the controller 56 may signal the motor 52 to drive the actuator 50 to lift the packer wheel 38 enabling the opener 32 to sink into the soil and form a deeper trench, which may place the seeds in more moist soil. As the seeding implement 8 traverses the field the moisture content of the soil may increase. As the controller 56 detects the increase in soil moisture through communication with the sensors 54, the controller 56 may determine that the moisture content is greater than a threshold level. In response, the controller 56 may signal the motor 52 to lower the packer wheel 38 with the actuator 50 to raise the opener 32 and reduce the depth of the trench. In addition to soil moisture, the controller 56 may lift or lower the opener 32 in response to signals indicative of other soil properties (e.g., soil temperature and organic matter content) that are less than or greater than a threshold level.

In some embodiments, the controller 56 may receive feedback from multiple sensors 54 each providing feedback regarding one or more soil properties. However, the measured levels and/or amounts of these properties may not all be within desired threshold levels. For example, a first property may be below a threshold amount while a second property is greater than a threshold level. In these situations, the controller 56 may be programmed to provide a solution that favors one property (e.g., soil moisture) over another property (e.g., soil temperature). That is, the controller 56 may increase or decrease the depth of the trench to increase one soil property over another soil property. In another embodiment, the controller 56 may be programmed to find a depth solution that compromises between the two properties. For example, the depth of the trench may not optimize soil moisture and organic matter content but improves both properties or improves both properties but does not improve a first property as much as the second property. It should be understood that the controller 56 may be programmed to adjust the depth in response to multiple soil property conditions (e.g., 1, 2, 3, 4, 5) that are sensed by one or more sensors 54. In some embodiments, the data received by the sensors 54 may be associated with specific locations (e.g., global positioning system coordinates) and stored for later use with other farm management techniques (e.g., fertilizer prescription maps for a future seeding season).

Figure 3:
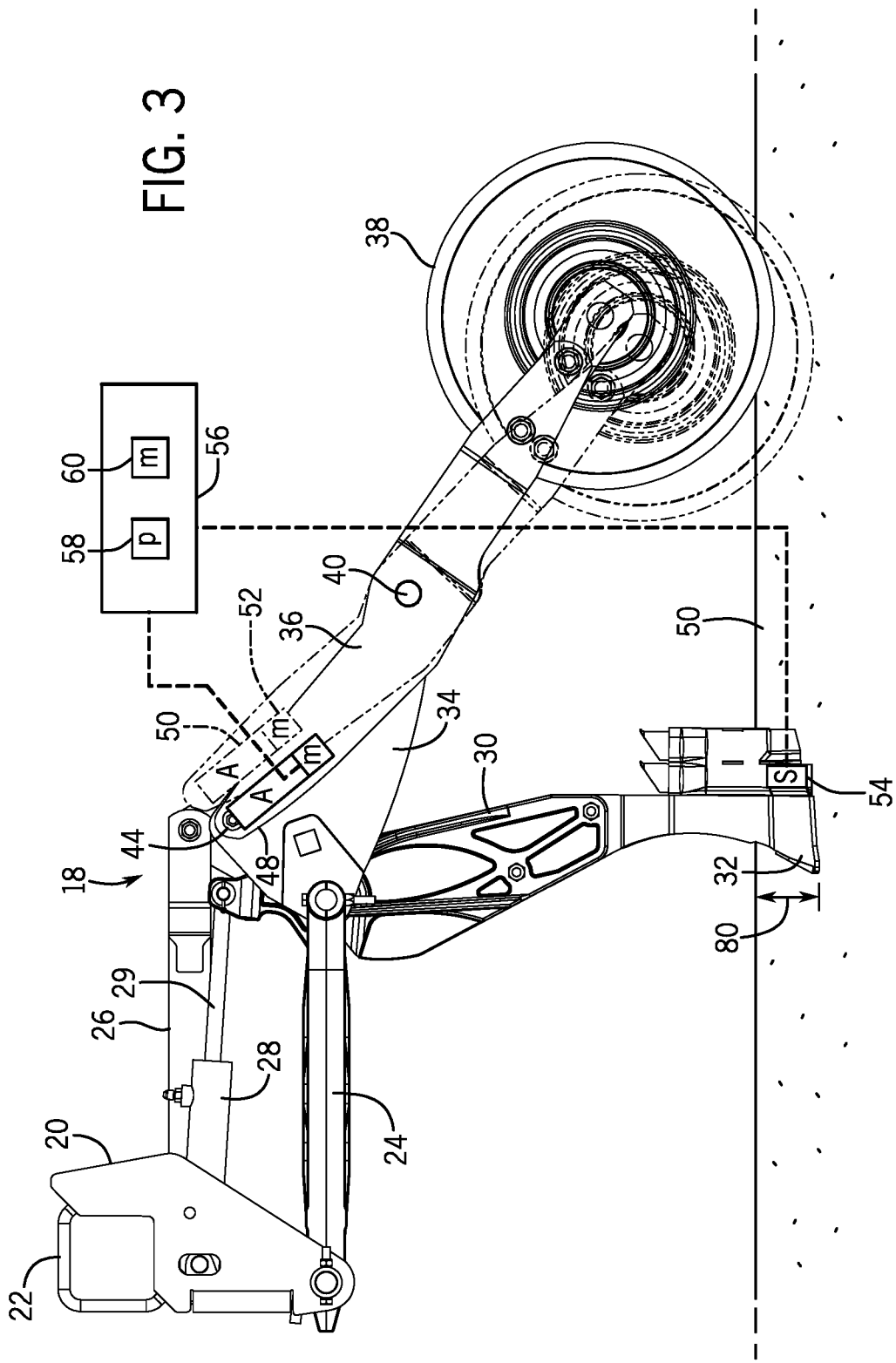
FIG. 3 is a side view of the row unit with the soil sensor system of FIG. 2; accordingly to an embodiment of the disclosure.

FIG. 3 is a side view of the row unit 18, as shown in FIG. 2, illustrating operation of the opener 32 and packer wheel 38. Specifically, the opener 32 is configured to engage soil at a particular depth 80. The depth 80 may be selected based on one or more soil properties. In order to detect the soil characteristics, the sensor(s) 54 are placed below the surface of the field at a desired depth. The sensors 54 couple to the opener 32, which supports the sensors 54 in a trench or opening in the ground formed by the opener 32. Accordingly, as the seeding implement 8 traverses the field, the opener 32 forms a trench that enables the placement of the sensors 54 below the surface of the field to measure soil properties.

Figure 4:
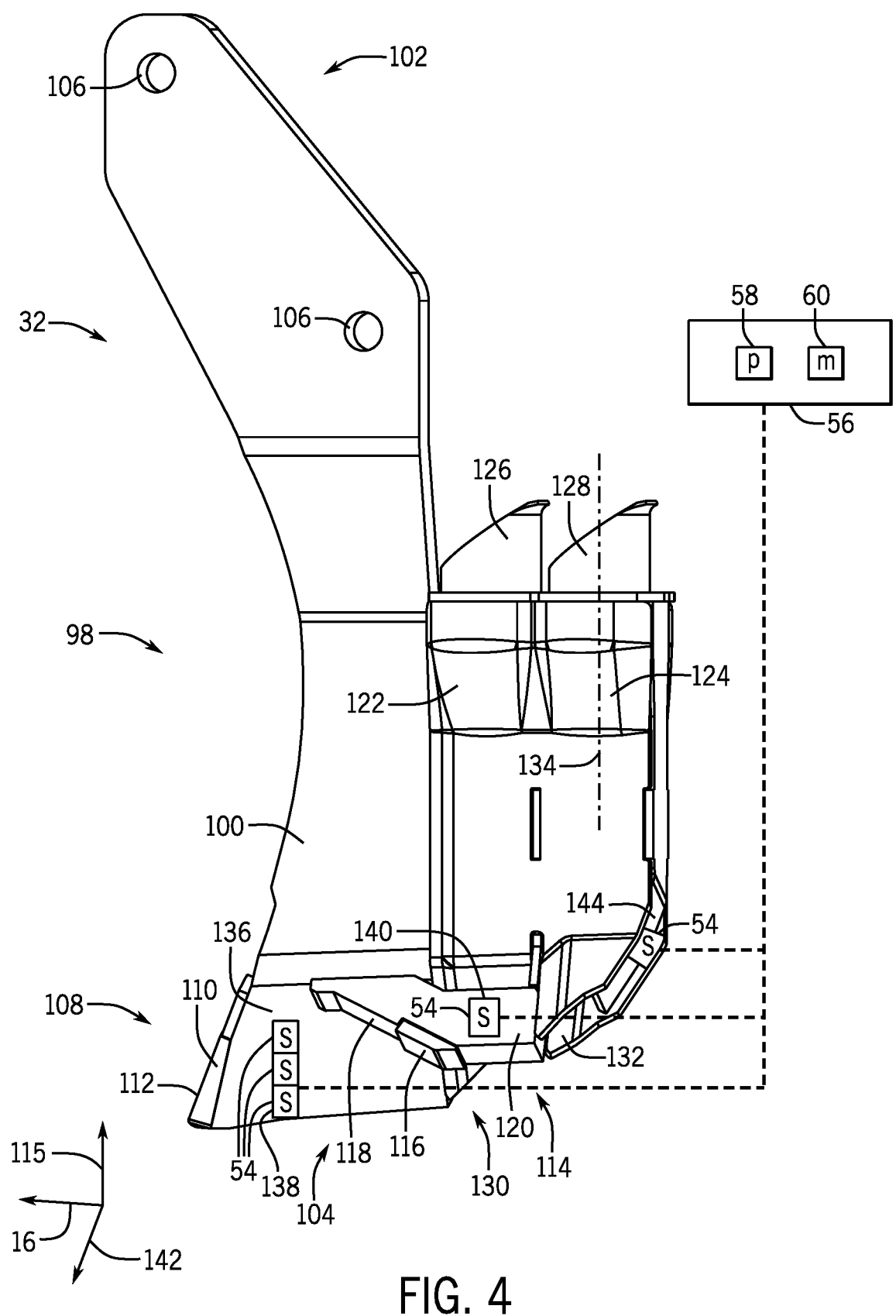
FIG. 4 is a perspective view of an opener, according to embodiment of the disclosure.

FIG. 4 is a perspective view of a first side 98 of the opener 32 (e.g., non-rotating opener). The opener 32 includes a body 100. The body 100 defines a first end 102 and a second end 104. The body 100 couples to the row unit 18 with the first end 102. For example, the first end 102 may define one or more apertures 106 that receive fasteners (e.g., threaded fasteners) that couple the body 100 to the shank 30 of the row unit 18. The second end 104 defines a primary or first blade 108 that cuts into the soil to form a primary or first trench.

As illustrated, the first blade 108 includes a front edge or surface 110. In some embodiments, one or more pads 112 (e.g., abrasion resistant pads) may couple to the front edge 110. The pads 112 may include material that is more resistant to abrasion than the body 100. For example, the pads 112 may be formed from a ceramic or carbide while the body 100 may be formed from a metal (e.g., steel). In operation, the pads 112 block and/or reduce wear of the first blade 108 as the opener 32 is pulled through the soil. In some embodiments, the thickness of the pad 112 may vary.

The opener 32 may also include a second blade 114. The second blade 114 cuts into the soil to form a second trench in the soil. The second blade 114 may be behind the front edge 110 in the direction of travel 16 and offset from the second end 104 of the body 100 in directions 115 and/or 142. The second blade 114 may also be angled relative to the body 100 and/or the first blade 108. The primary and second blades 108, 114 may therefore enable deposition of agricultural particulate at different depths in the soil by cutting the soil at different levels. In some embodiments, one or more pads 116 (e.g., abrasion resistant pads) may couple to the front edge 110 of the second blade 114. The pad 118 may include material that is more resistant to abrasion than the body 100. For example, the pad 118 may be formed from a ceramic or carbide while a body 120 of the second blade 114 may be formed of a metal (e.g., steel).

The first and second blades 108, 114 form respective trenches, which facilitate deposition of different agricultural products into the soil. For example, the first blade 108 may form a first trench that receives fertilizer and the second blade 114 forms the second trench that receives the seeds. In order to direct agricultural product into the first and second trenches, the opener 32 includes first and second conduits 122 and 124. The conduits 122 and 124 couple to hoses and direct agricultural product from respective inlets 126 and 128 to respective outlets 130 and 132. As illustrated, the outlet 132 is angled relative to a central axis 134 of the inlet 128.

As explained above, the soil sensor system 10 detects soil characteristics with one or more sensors 54 (e.g., 1, 2, 3, 4, 5). In some embodiments, the soil sensor system 10 may include a plurality of sensors 54 at different positions along the body 100 in direction 115 in order to measure soil conditions or properties at different levels in the trench. In order to facilitate measurement and/or to protect the sensors 54, the sensors 54 may be placed at various locations on the opener 32. For example, the soil sensor system 10 may include a sensor 54 on a side surface 136 of the first blade 108 to facilitate measurement of the soil characteristics in the first trench. In order to block contact with and/or reduce abrasion the sensor 54 may be embedded in a recess 138 in the first blade 108. In some embodiments, the sensor 54 may also be covered with a transparent protective material that resists abrasion, such as sapphire glass. In some embodiments, the opener 32 may also include a sensor 54 coupled to the second blade 114. The sensor 54 coupled to the second blade 114 may similarly be embedded in a groove 140 and protected with a transparent abrasive resistant material in order to block and/or reduce abrasion between the sensor 54 and the soil as the opener 32 moves through the soil.

In some embodiments, a portion of the blades 108 and/or 114 (e.g., pads 112 and 116) may extend outward in direction 142 creating a protrusion or lip that blocks and/or reduces contact between the soil and the sensors 54 as the opener 32 moves in direction 16 through the soil. That is, the protrusion may widen the trench and direct soil away from the sensors 54 as the opener 32 moves through the soil. In some embodiments, a sensor 54 may couple to a rear surface 144 of the conduit 124 or rest within a recess formed by the rear surface 144. In this position, the sensor 54 may be shielded from abrasive contact with the soil during operation, while still facilitating measurement of soil characteristics.

Figure 5:
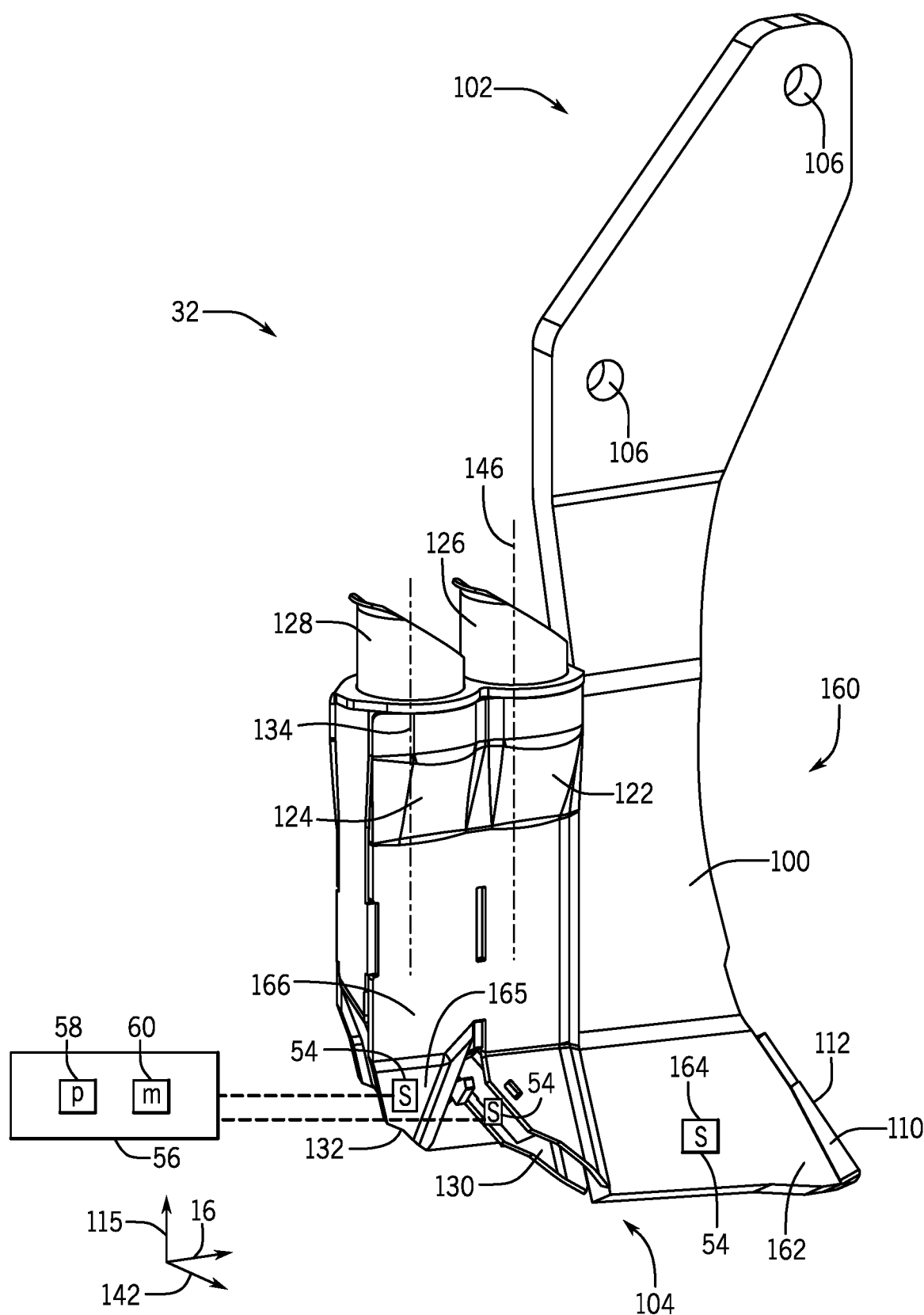
FIG. 5 is a perspective view of the opposing side of the opener in FIG. 4, according to embodiment of the disclosure.

FIG. 5 is a perspective view of an opposing side 160 of the opener 32 in FIG. 4. As illustrated, sensors 54 may also be placed on the side 160 of the opener 32. For example, the soil sensor system 10 may include a sensor 54 on a side surface 162 of the first blade 108 to facilitate measurement of the soil characteristics. The sensor 54 may be embedded in a recess 164 in the side surface 162 to reduce abrasion. The sensors 54 may also be covered with a transparent protective material that resists abrasion, such as sapphire glass.

As explained above, the outlet 132 of the conduit 124 is angled relative to a central axis 134 of the inlet 128, which forms an angled portion 165. The outlet 130 of the conduit 122 may similarly be angled relative to central axis 146 of the inlet 126. It should be noted that the outlets 130 and 132 are angled away from each other. A sensor 54 may therefore couple an angled portion 165 of a side surface 166 of the second conduit 124 behind the first conduit 122 in the direction of travel 16. In this location, the sensor 54 may be shielded or protected from abrasive contact with soil by the first conduit 122. That is, first conduit 122 may direct soil away from the sensor 54 coupled to the angled portion 165 and thus reduce or block the direct impact of soil against the sensor 54.

Figure 6:
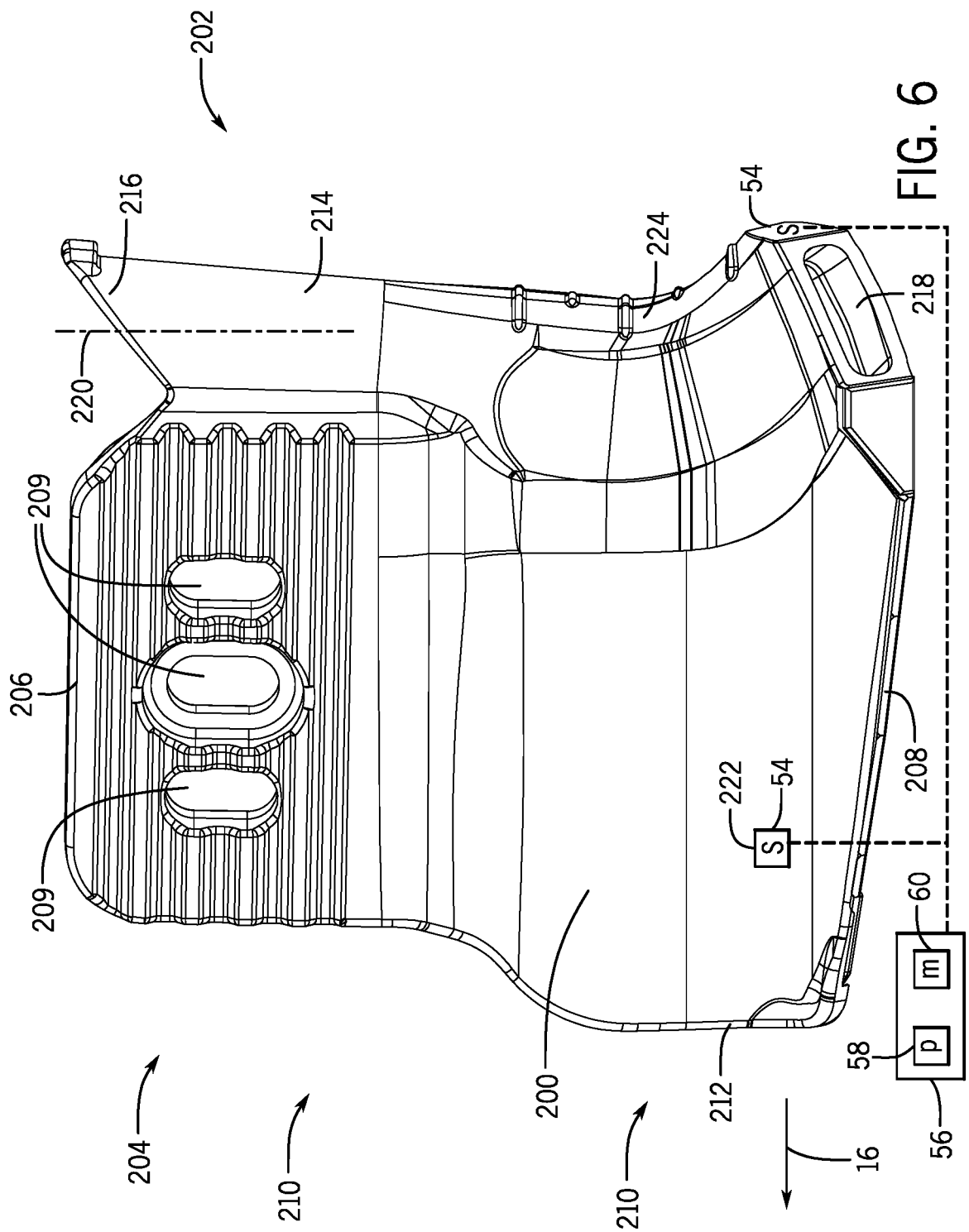
FIG. 6 is a perspective view of an opener, according to embodiment of the disclosure.

FIG. 6 is a perspective view of a first side 200 of an opener 202 (e.g., non-rotating opener). The opener 202 includes a body 204 with a first end 206 and a second end 208. The body 204 couples to the row unit 18 with the first end 206. For example, the first end 206 may define one or more apertures 209 that receive fasteners (e.g., threaded fasteners) that couple the body 204 to the row unit 18. The second end 208 defines a blade 210 that cuts into the soil to form a trench.

As illustrated, the blade 210 includes a front edge or surface 212. In some embodiments, one or more pads (e.g., abrasion resistant pads) may couple to the front edge 212. On the opposite end of the body 204 is a conduit 214 that directs agricultural product into the trench. In some embodiments, the body 204 and conduit 214 may be one-piece. The conduit 214 receives agricultural product from a hose and directs the agricultural product from an inlet 216 to an outlet 218. As illustrated, the outlet 218 is angled relative to a central axis 220 of the inlet 216.

As explained above, the soil sensor system 10 detects soil characteristics with one or more sensors 54 (e.g., 1, 2, 3, 4, 5). The sensors 54 may be placed at various locations on the opener 202 to facilitate measurement and/or to protect the sensors 54 from abrasive contact with the soil. For example, the soil sensor system 10 may include a sensor 54 on a first side 200 of the blade 210 between the front edge or surface 212 and the conduit 214. In order to block contact with and/or reduce abrasion the sensor 54 may be embedded in a recess 222 in the blade 210. In some embodiments, the sensor 54 may be covered with a transparent protective material that resists abrasion, such as sapphire glass.

In some embodiments, a sensor 54 may couple to a rear surface 224 of the conduit 214 or be placed within a recess formed by the rear surface 224. In this position, the sensor 54 may be shielded from abrasive contact with the soil during operation, while still facilitating measurement of soil characteristics. For example, the sensors 54 may measure soil moisture, soil temperature, organic matter content, among others.

Figure 7:
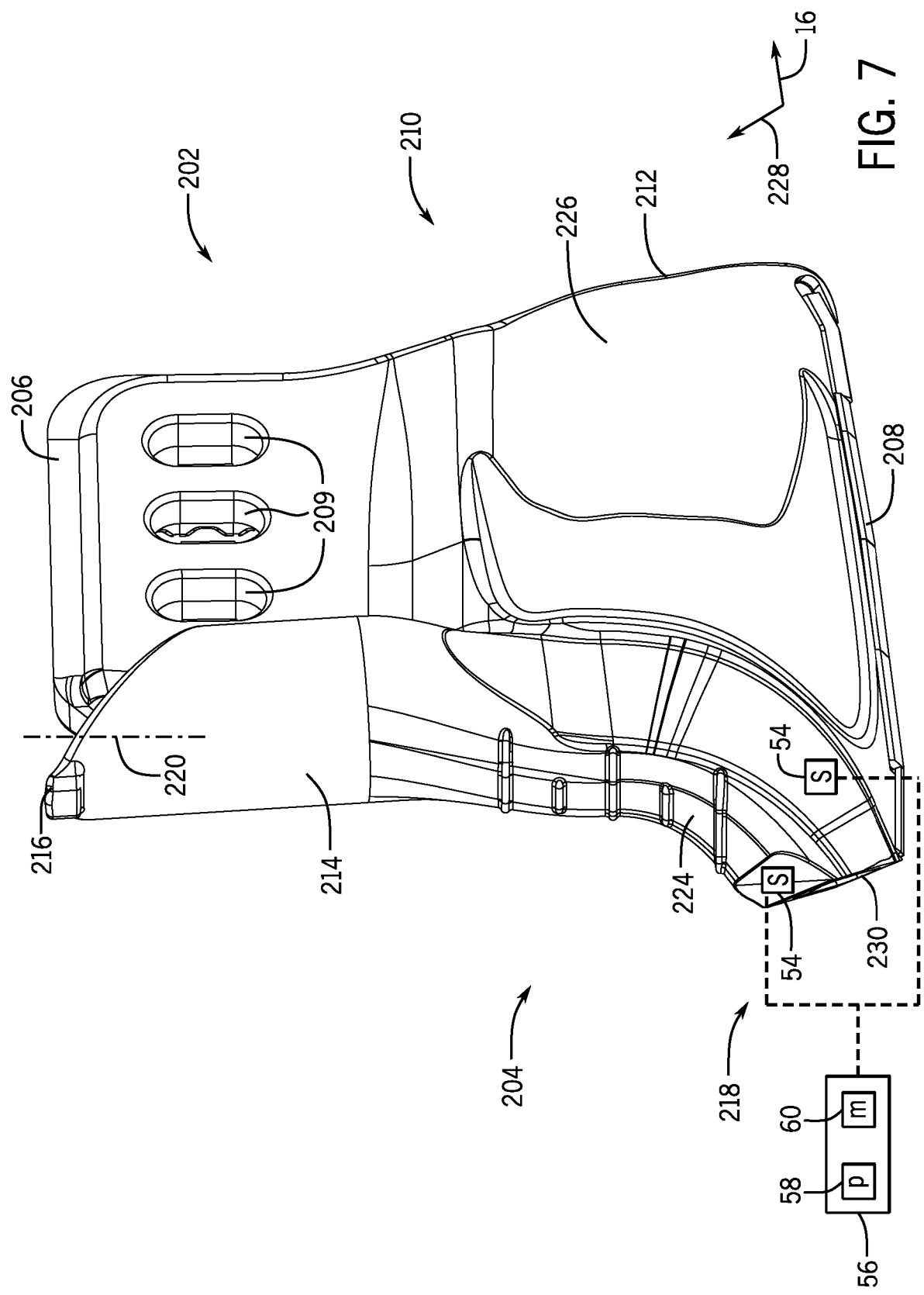
FIG. 7 is a perspective view of the opposing side of the opener in FIG. 6, according to embodiment of the disclosure.

FIG. 7 is a perspective view of an opposing side 226 of the opener 202 in FIG. 6. As illustrated, sensors 54 may also be placed on the side 226 of the opener 202. As explained above, the outlet 218 of the conduit 214 is angled relative to a central axis 220 of the inlet 216. By angling the outlet 218 relative to the central axis of the inlet 216, the opener 202 forms a curved surface at the second end 208. The curved or sweeping profile offsets the rear surface or end 224 relative to the leading edge 212 in the direction of travel 16 as well as curves the opener between the first end 206 and the second end 208. Placement of a sensor 54 proximate a trailing edge 230 reduces abrasive soil contact with the sensor 54, as the soil primarily contacts the side 200, the leading edge 212, and other portions of the side 226 of the opener 202.

Technical effects of the present disclosure include a soil sensor system that enables the detection of soil characteristics or properties that affect the growth and emergence of seeds. The soil sensor system uses signals from one or more sensors to determine the soil characteristics or properties and in response varies the depth of the trench in which the agricultural product is deposited. Further technical effects include placement of the sensor on an opener in order to reduce and/or block wear of the sensor from abrasive contact with soil during operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural planting or seeding implement, comprising:
 a ground engaging tool configured to form a trench in a field, the ground engaging tool comprising:
  a blade configured to form the trench;
  a first conduit coupled to the blade, the first conduit is configured to deposit agricultural product in the field; and
  at least one sensor coupled to the ground engaging tool, wherein the at least one sensor is configured to generate a first signal indicative of a first soil property of the field and a second signal indicative of a second soil property of the field, different from the first soil property of the field; and
 a controller communicatively coupled to the at least one sensor, wherein the controller is configured to receive the first and second signals, and the controller is configured to control a depth adjustment system to control a depth of the trench based on the first soil property and the second soil property, and the controller is configured to favor the first soil property over the second soil property in controlling the depth adjustment system.

2. The agricultural planting or seeding implement of claim 1, comprising the depth adjustment system, wherein the depth adjustment system is configured to control the depth of the trench by lifting and lowering a gauge wheel.

3. The agricultural planting or seeding implement of claim 2, wherein the first soil property comprises one of a soil moisture, an organic matter content, or a soil temperature, and the second soil property comprises another of the soil moisture, the organic matter content, or the soil temperature.

4. The agricultural planting or seeding implement of claim 1, wherein the ground engaging tool comprises a second conduit coupled to the first conduit, the first conduit is between the blade and the second conduit, and the second conduit is configured to deposit the agricultural product in the field.

5. The agricultural planting or seeding implement of claim 4, wherein the first conduit comprises a first angled portion, the second conduit comprises a second angled portion, and the at least one sensor couples to the second angled portion.

6. The agricultural planting or seeding implement of claim 1, wherein a second conduit defines a rear surface, and the at least one sensor couples to the rear surface of the second conduit.

7. The agricultural planting or seeding implement of claim 6, wherein the at least one sensor is configured to rest within a recess formed by the rear surface.

8. The agricultural planting or seeding implement of claim 1, wherein the first conduit comprises a rear surface, and the at least one sensor couples to the rear surface.

9. An agricultural planting or seeding implement, comprising:
a ground engaging tool configured to form a trench in a field, the ground engaging tool comprising:
a ground engaging tool body;
a blade coupled to the ground engaging tool body, the blade is configured to form the trench;
a first conduit coupled to the blade and configured to deposit agricultural product in the field; and
at least one sensor coupled to the ground engaging tool, wherein the at least one sensor is configured to generate a first signal indicative of a first soil property of the field and a second signal indicative of a second soil property of the field, different from the first soil property of the field; and
a controller communicatively coupled to the at least one sensor, wherein the controller is configured to receive the first and second signals, the controller is configured to control a depth adjustment system to control a depth of the trench based on the first soil property and the second soil property, and the controller is configured to favor the first soil property over the second soil property in controlling the depth adjustment system.

10. The agricultural planting or seeding implement of claim 9, wherein the at least one sensor comprises a light emitter and a light detector.

11. The agricultural planting or seeding implement of claim 9, wherein the first soil property comprises one of a soil moisture, an organic matter content, or a soil temperature, and the second soil property comprises another of the soil moisture, the organic matter content, or the soil temperature.

12. The agricultural planting or seeding implement of claim 9, wherein the ground engaging tool comprises a second conduit coupled to the first conduit, the first conduit is between the blade and the second conduit, and the second conduit is configured to deposit the agricultural product in the field.

13. The agricultural planting or seeding implement of claim 9, wherein the at least one sensor couples to a second conduit.

14. The agricultural planting or seeding implement of claim 9, comprising the depth adjustment system, wherein the depth adjustment system is configured to control the depth of the trench by lifting and lowering a gauge wheel.

15. An agricultural planting or seeding implement, comprising:
a ground engaging tool configured to form a trench in a field, the ground engaging tool comprising:
a ground engaging tool body;
a blade coupled to the ground engaging tool body, wherein the blade curves from a front edge to a rear surface, and the blade is configured to form the trench;
a conduit coupled to the blade and configured to deposit agricultural product in the field; and
at least one sensor coupled to the ground engaging tool, wherein the at least one sensor is configured to generate a first signal indicative of a first soil property of the field and a second signal indicative of a second soil property of the field, different from the first soil property of the field; and
a controller communicatively coupled to the at least one sensor, wherein the controller is configured to receive the first and second signals, the controller is configured to control a depth adjustment system to control a depth of the trench based on the first soil property and the second soil property, and the controller is configured to favor the first soil property over the second soil property in controlling the depth adjustment system.

16. The agricultural planting or seeding implement of claim 15, wherein the at least one sensor comprises a light emitter and a light detector.

17. The agricultural planting or seeding implement of claim 15, comprising the depth adjustment system, wherein the depth adjustment system is configured to control the depth of the trench by lifting and lowering a gauge wheel.

* * * * *